US012784229B2

(12) United States Patent
Zhang et al.

(10) Patent No.: US 12,784,229 B2
(45) Date of Patent: Nov. 3, 2026

(54) BURST IMAGE MATTING

(71) Applicant: ADOBE INC., San Jose, CA (US)

(72) Inventors: Xuaner Zhang, Union City, CA (US); Xinyi Wu, Shenzhen (CN); Markus Jamal Woodson, San Jose, CA (US); Joon-Young Lee, San Jose, CA (US); Brian Price, Pleasant Grove, UT (US); Jiawen Chen, San Ramon, CA (US)

(73) Assignee: Adobe Inc., San Jose, CA (US)

(*) Notice: Subject to any disclaimer, the term of this patent is extended or adjusted under 35 U.S.C. 154(b) by 345 days.

(21) Appl. No.: 18/123,658

(22) Filed: Mar. 20, 2023

(65) Prior Publication Data

US 2024/0320838 A1 Sep. 26, 2024

(51) Int. Cl.

*G06T 7/194* (2017.01)
*G06T 7/174* (2017.01)
*G06T 7/33* (2017.01)

(52) U.S. Cl.

CPC .............. *G06T 7/194* (2017.01); *G06T 7/174* (2017.01); *G06T 7/337* (2017.01); *G06T 2207/20081* (2013.01); *G06T 2207/20084* (2013.01); *G06T 2207/20221* (2013.01)

(58) Field of Classification Search

CPC ......... G06T 7/194; G06T 7/174; G06T 7/337; G06T 7/11; G06T 7/215; G06T 7/246; G06T 7/248; G06T 2207/20081; G06T 2207/20084; G06T 2207/20221; G06T 2207/10016

See application file for complete search history.

(56) References Cited

U.S. PATENT DOCUMENTS 7,834,894 B2 * 11/2010 Swanson ................ H04N 5/272
348/207.99
8,611,728 B2 * 12/2013 Bhagavathy ............ G06T 7/254
386/280
10,382,712 B1 * 8/2019 Forutanpour .......... H04N 23/80
2004/0062439 A1 * 4/2004 Cahill ........................ G06T 5/50
382/209
2021/0166400 A1 * 6/2021 Goel .................. G06V 10/7747
2023/0087489 A1 * 3/2023 Feng ........................ G06T 7/194
382/100
2024/0071035 A1 * 2/2024 Tsogkas ................. G06V 10/62
(Continued)

FOREIGN PATENT DOCUMENTS

GB 2557417 A * 6/2018 ........... H04N 25/587

OTHER PUBLICATIONS

Bhat, Goutam, et al. "Deep burst super-resolution." Proceedings of the IEEE/CVF conference on computer vision and pattern recognition. 2021. (Year: 2021).*
(Continued)

*Primary Examiner* — Henok Shiferaw
(74) *Attorney, Agent, or Firm* — Shook, Hardy & Bacon L.L.P.

(57) ABSTRACT

Systems and methods perform image matte generation using image bursts. In accordance with some aspects, an image burst comprising a set of images is received. Features of a reference image from the set of images is aligned with features of other images from the set of images. A matte for the reference image is generated using the aligned features.

20 Claims, 13 Drawing Sheets

(56) References Cited

U.S. PATENT DOCUMENTS

2024/0378912 A1* 11/2024 Sarkar .................... G06V 10/46
2024/0394889 A1* 11/2024 Zhang ................. G06F 3/04845

OTHER PUBLICATIONS

Zhao, Xu, et al. "Joint background reconstruction and foreground segmentation via a two-stage convolutional neural network." 2017 IEEE International Conference on Multimedia and Expo (ICME). IEEE, 2017. (Year: 2017).*
Mehta, Nancy, et al. "Adaptive feature consolidation network for burst super-resolution." Proceedings of the IEEE/CVF conference on computer vision and pattern recognition. 2022. (Year: 2022).*
Luo, Ziwei, et al. "Bsrt: Improving burst super-resolution with swin transformer and flow-guided deformable alignment." Proceedings of the IEEE/CVF Conference on Computer Vision and Pattern Recognition. 2022. (Year: 2022).*
Luo, Ziwei, et al. "Ebsr: Feature enhanced burst super-resolution with deformable alignment." Proceedings of the IEEE/CVF Conference on Computer Vision and Pattern Recognition. 2021. (Year: 2021).*
Cho, Donghyeon, et al. "Automatic trimap generation and consistent matting for light-field images." IEEE transactions on pattern analysis and machine intelligence 39.8 (2016): 1504-1517. (Year: 2016).*
Chen, Jun, et al. "Multi-focus image fusion based on multi-scale gradients and image matting." IEEE Transactions on Multimedia 24 (2021): 655-667. (Year: 2021).*
Kim, Sun-Jung, et al. "The method for defocusing selfie taken by mobile frontal camera using burst shot." 2016 IEEE International Conference on Acoustics, Speech and Signal Processing (ICASSP). IEEE, 2016. (Year: 2016).*
Sun, Yanan, et al. "Deep video matting via spatio-temporal alignment and aggregation." Proceedings of the IEEE/CVF Conference on Computer Vision and Pattern Recognition. 2021. (Year: 2021).*
Chen, Yibo, Jingwei Guan, and Wai-Kuen Cham. "Robust multi-focus image fusion using edge model and multi-matting." IEEE Transactions on Image Processing 27.3 (2017): 1526-1541. (Year: 2017).*
Wang, Tiantian, et al. "Video matting via consistency-regularized graph neural networks." Proceedings of the IEEE/CVF International Conference on Computer Vision. 2021. (Year: 2021).*

* cited by examiner

BURST IMAGE MATTING

BACKGROUND

In image editing and composition, users often desire to extract or otherwise segment an object or multiple objects (i.e., foreground objects) from the remainder (i.e., background) of an image. Image segmentation is a process of generating a matte (or mask) for an image and applying the matte to the image to separate a foreground object from the background. A matte can include, for instance, values (e.g., alpha values) for each pixel to indicate which pixels have foreground information and which pixels have background information. Often, some pixels of an image, particularly those around edges of objects and in regions corresponding to hair, glass, and motion blur, can have values indicative of a combination of both foreground and background information. Accurately segmenting the foreground from the background in these regions is particularly challenging.

SUMMARY

Some aspects of the present technology relate to, among other things, an image processing system that leverages image bursts for matte generation. An image burst is a collection of sequentially captured images (i.e., "burst images"). Given the series of burst images from an image burst, the image processing system identifies a reference image from the image burst for matte generation. The image processing system aligns features from the reference image with features from the other burst images. This feature alignment involves aligning corresponding portions of the reference image and the other burst images. In various aspects, the feature alignment comprises implicit feature alignment by a machine learning model, background reconstruction, foreground reconstruction, foreground modeling, or a combination of those techniques. The image processing system leverages the feature alignment information to generate a matte for the reference image that better captures the contribution of a foreground object and background to pixels in boundary regions between the foreground object and background.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
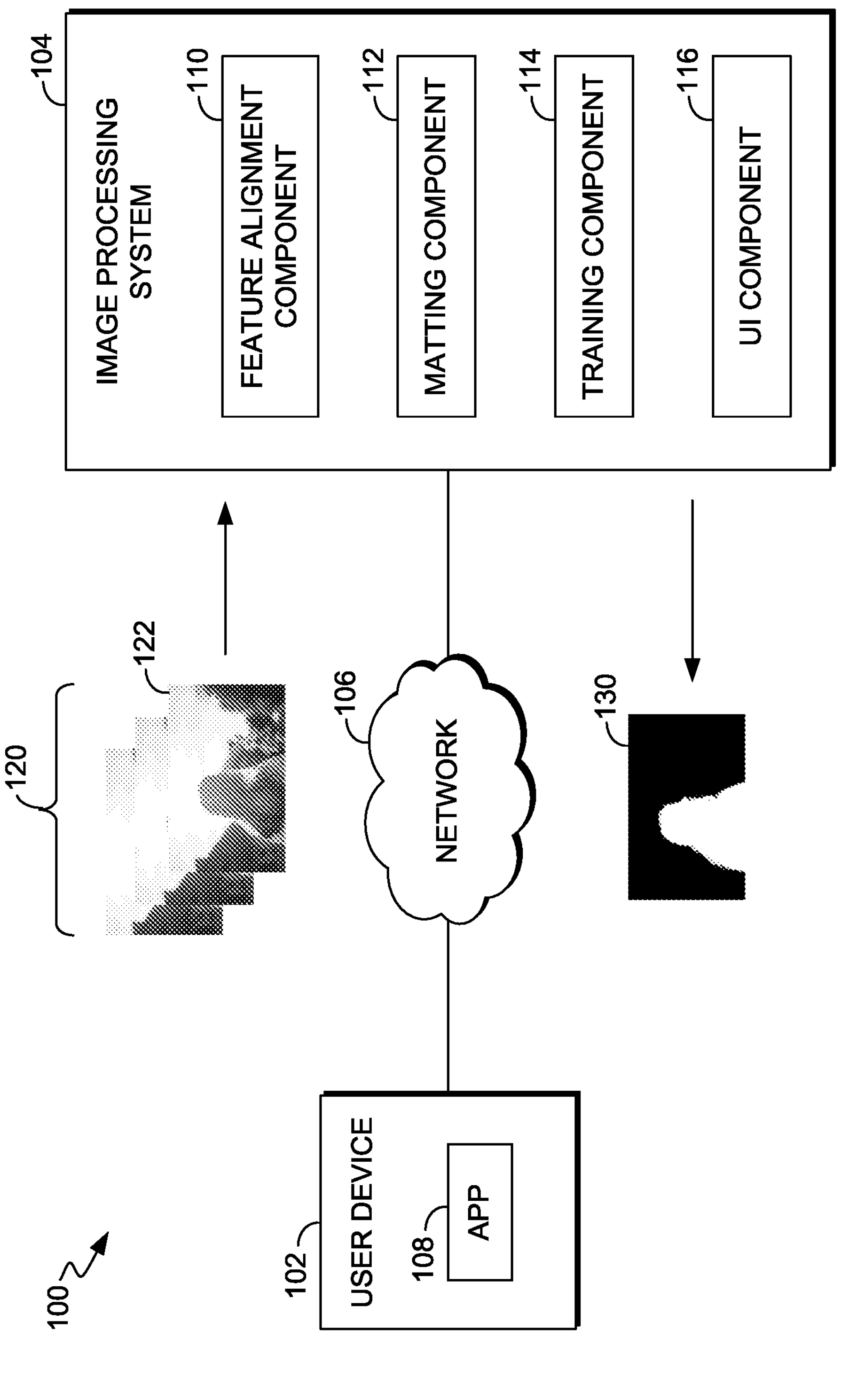
FIG. 1 is a block diagram illustrating an exemplary system in accordance with some implementations of the present disclosure.

A conventional approach to matting involves a user manually drawing a boundary around a foreground object in an image to segment the object from the image. This is not only time-consuming but can provide lackluster results depending on how accurately the user can draw the boundary around the subject object. Given this, some image editing applications provide features that automatically select and segment foreground objects from images. However, developing an approach for a computer to automatically detect a foreground object in an image and accurately determine the foreground object's boundary for segmentation is difficult. While images with simple backgrounds and clear boundaries between foreground objects and background are generally easier to process, conventional image processing applications have difficulty in cleanly segmenting foreground objects in the case of more complex boundaries and/or when a foreground object has a more complex edge, such as portions of an object with hair or fur.

Aspects of the technology described herein improve the functioning of the computer itself in light of these shortcomings in existing technologies by providing an image processing system that leverages information from multiple images in an image burst to generate a matte for a reference image in the image burst. An image burst is collection of images that are captured in quick succession. For instance, many camera devices (e.g., smart phones) include a burst mode that provides the capability to capture a burst of images. Because an image burst includes a collection of images with some movement of a foreground object relative to the background, the image burst contains more information that is utilized by aspects of the technology described herein to generate a matte that more accurately captures foreground object and background contribution to pixels at the boundary between the foreground object and background.

In accordance with some aspects of the present technology, an image processing system receives an image burst that includes a series of images (sometimes referred to herein as "burst images") and generates a matte for one of the images from the image burst, which is referred to herein as a reference image. More particularly, given an image burst, the image processing system aligns features from the reference image with features from the other burst images from the image burst. This could include, for instance, aligning portions of the reference image with corresponding portions of the other burst images. This alignment allows for information from the various burst images to be leveraged to better determine the foreground and background contributions to pixels in the reference image. The image processing system leverages the feature alignment information to generate a matte for the reference image.

Feature alignment and matte generation by the image processing system can be performed using any of a number of different approaches within the scope of the technology described herein. Each approach can be employed individually or combined with other approaches. In some aspects, the image processing system employs a machine learning model that implicitly learns how to leverage the information available from the burst images to align features between the reference image and other burst images. In some aspects, the image processing aligns features between the burst images to reconstruct a background, and employs the reconstructed background for matte generation. In some aspects, the image processing aligns features between the burst images to reconstruct a foreground, and employs the reconstructed foreground for matte generation. In some aspects, the image processing system computes a model of a foreground object, such as a model that provides a range of colors of the foreground object, and leverages the foreground model for matte generation.

The feature alignment and matting techniques described herein can be performed on entire images in some configurations. However, in some configurations the feature alignment and matting techniques are performed on regions of the images that correspond to the boundary between the foreground object and background. Additionally, the techniques described herein can operate on different image formats, including image formats with raw pixel values or processed pixel values (e.g., demosaiced images).

Aspects of the technology described herein provide a number of improvements over existing technologies. For instance, aspects of the technology described herein leverage information available from image bursts to provide improved matte generation over conventional matte generation processes. An image burst includes images in which the foreground object moves relative to the background. The technology described herein leverages this relative movement across the burst images to better determine the contribution of the foreground object and background to pixels at the boundary between the foreground object and the background. This provides improved matte generation, for instance, at regions of fine detail of a foreground object, such as regions with hair or fur.

Example System for Burst Image Matting

With reference now to the drawings, FIG. 1 is a block diagram illustrating an exemplary system 100 for employing burst images to enhance image matting in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and an image processing system 104. Each of the user device 102 and image processing system 104 shown in FIG. 1 can comprise one or more computer devices, such as the computing device 1300 of FIG. 13, discussed below. As shown in FIG. 1, the user device 102 and the image processing system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of user devices and server devices can be employed within the system 100 within the scope of the present technology. Each can comprise a single device or multiple devices cooperating in a distributed environment. For instance, the image processing system 104 could be provided by multiple server devices collectively providing the functionality of the image processing system 104 as described herein. Additionally, other components not shown can also be included within the network environment.

The user device 102 can be a client device on the client-side of operating environment 100, while the image processing system 104 can be on the server-side of operating environment 100. The image processing system 104 can comprise server-side software designed to work in conjunction with client-side software on the user device 102 so as to implement any combination of the features and functionalities discussed in the present disclosure. For instance, the user device 102 can include an application 108 for interacting with the image processing system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the image processing system 104 remain as separate entities. While the operating environment 100 illustrates a configuration in a networked environment with a separate user device 104 and image processing system 104, it should be understood that other configurations can be employed in which components are combined. For instance, in some configurations, the user device 102 can also provide some or all of the capabilities of the image processing system 104 described herein.

The user device 102 comprises any type of computing device capable of use by a user. For example, in one aspect, the user device comprises the type of computing device 1300 described in relation to FIG. 13 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device where notifications can be presented. A user can be associated with the user device 102 and can interact with the image processing system 104 via the user device 102.

At a high level, the image processing system 104 generates a matte for a reference image from an image burst by leveraging information from the collection of images in the image burst. For instance, FIG. 1 provides an example in which an image burst 120, which includes a reference image 122 and any number of other burst images, is provided as input to the image processing system 104. Based on the image burst 120, the image processing system 104 generates a matte 130 for the reference image 122. As shown in FIG. 1, the image processing system 104 includes a feature alignment component 110, a matting component 112, a training component 114, and a user interface component 116. The components of the image processing system 104 can be in addition to other components that provide further additional functions beyond the features described herein. The image processing system 104 can be implemented using one or more server devices, one or more platforms with corresponding application programming interfaces, cloud infrastructure, and the like. While the image processing system 104 is shown separate from the user device 102 in the configuration of FIG. 1, it should be understood that in other configurations, some or all of the functions of the image processing system 104 can be provided on the user device 102.

In one aspect, the functions performed by components of the image processing system 104 are associated with one or more applications, services, or routines. In particular, such applications, services, or routines can operate on one or more user devices, servers, can be distributed across one or more user devices and servers, or be implemented in the cloud. Moreover, in some aspects, these components of the image processing system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some aspects, functionality of these components can be shared or distributed across other components.

Given an image burst, such as the image burst 120, the feature alignment component 110 of the image processing system 104 aligns features from a reference image, such as the reference image 122, with features from other burst images, such as the other burst images from the image burst 120. Generally, feature alignment between the reference image and other burst images from the image burst involves aligning portions of the reference image with corresponding portions of the other burst images. This takes advantage of movement of the foreground relative to the background in the various images such that some portions of the background and/or foreground are visible in some burst images where they are not in other burst images. The feature alignment component 110 aligns portions of the reference image and the other burst images to provide information based on slightly different views of corresponding regions amongst the burst images.

The feature alignment component 110 aligns features between the reference image and other burst images using any of a number of different approaches within the scope of the technology described herein. Each approach can be employed individually or combined with other approaches. By way of example, in some aspects, the feature alignment component 110 employs a machine learning model (e.g., a fusion network as discussed in further detail below) that implicitly learns how to leverage the information available from the burst images to align features between the reference image and other burst images.

In some aspects, the feature alignment component 110 aligns features between the burst images to reconstruct a background. In such configurations, the feature alignment component 110 reconstructs, either explicitly (e.g., using a machine learning model) or implicitly (e.g., in a fusion network), the background pixels behind a foreground object to better constrain the matting problem. Some configurations leverage the classic matting equation:

$$I=\text{alpha}*F+(1-\text{alpha})*B$$

where I is an image matte, F is foreground, and B is background. For RGB images, there are 3 equations (one equation each for the red, green and blue channel) at each pixel with 7 unknowns (3 unknowns for F since it is an RGB color, 3 unknowns for B for the same reason, and 1 unknown for alpha), making the problem heavily under-constrained. If the background is known, this leaves only 4 unknowns, still an unconstrained problem but easier to resolve. Several methods use this to make the problem easier. For instance, green screen technology uses a plain green background to reduce the problem to 4 unknowns. Background matting technology uses a static background image to similarly reduce the problem to 4 unknowns. For instance, background matting technology can leverage an image of a background without a foreground object from a similar perspective/position as an image with a foreground object. This requires a static background (with nothing moving) and a static camera position (e.g. a camera on a tripod). In accordance with some aspects of the technology described herein, a set of burst images is used to generate a background image without a foreground object. In particular, since the foreground object and the camera are moving slightly between burst images, the burst images are aligned to determine background pixels at certain locations behind hair and other details of the foreground object.

In some aspects, the feature alignment component 110 aligns features between the images to reconstruct a foreground object. In such configurations, the feature alignment component 110 reconstructs, either explicitly (e.g., using a machine learning model) or implicitly (e.g., in a fusion network), foreground pixels to better constrain the matting problem. In some cases, such as where two hairs cross one another, burst images are aligned based on the foreground. This could employ some knowledge about what the foreground is, but in certain cases that can be derived, for instance, from a preliminary lower-resolution matte. The burst images provide a foreground region in front of varying backgrounds, and perhaps with slight subpixel shifts. This can simplify the matting equation. For example, for 2 images, there are 6 equations (3 for each image for RGB values), but since the foreground colors are the same in each image, this would provide only 11 unknowns instead of 14 unknowns. For 4 images, there are 12 equations and 19 unknowns instead of 28 unknowns. In some cases, foreground reconstruction can be combined with background reconstruction. The combined reconstructions provide both foreground and background color values, further reducing the number of unknowns and allowing for alpha to be determined.

In some aspects, the feature alignment component 110 uses the burst images to compute a model of a foreground object, such as a model that provides a range of colors of the foreground object. Given multiple images from an image burst, a foreground model of the colors making up the foreground object is generated, for instance, using a machine learning model (e.g., a neural network). While foreground modeling could be done with a single image, using multiple images from an image burst yields a better result.

The matting component 112 leverages information from the feature alignment provided by the feature alignment component 110 to generate a matte for the reference image. In the example of FIG. 1, the matting component 112 generates the matte 130 for the reference image 122 from the image burst 120 based on the feature alignment information generated from the image burst 120 by the feature alignment component 110. The matting component 112 can employ any of a number of different approaches for generating a matte for a reference image from an image burst using feature alignment information based on the feature alignment approach employed by the feature alignment component 110. In some aspects, the matting component 112 employs a machine learning model trained to generate a matte, a classic matting equation for determining alpha values, and/or other approaches. Some examples of different feature alignment and matting approaches are discussed in further detail below with reference to FIGS. 2-6.

In some configurations, the feature alignment component 110 and/or the matting component 112 operate on entire images from an image burst. In other configurations, the feature alignment component 110 and or the matting component 112 operate on certain regions of images from an image burst. These regions generally correspond to areas around the edges of a foreground object. In some aspects, the regions can be referred to as boundary regions as they correspond to areas with a boundary between a foreground object and a background. In some configurations, the regions correspond to more complex boundaries and/or when a foreground object has a more complex edge, such as portions of an object with hair or fur (as opposed to regions with a clean boundary between the foreground object and background).

Focusing aspects of the technology described herein on regions reduces the extent of processing required to generate a matte relative to processing entire images as the portions of the images that are clearly foreground and clearly background are initially identified using less computationally-intensive approaches. The regions can be identified using a number of different approaches. In some instances, conventional approaches for generating a trimap from a reference image are employed as a preliminary step. A trimap identifies image portions (e.g., pixels) as definite foreground, portions as definite background, and portions as unknown whether foreground or background. The portions identified as unknown whether foreground or background can be selected as the regions for processing using aspects of the technology described herein.

By way of example, the following process could be used to select boundary regions of a reference image. Given a higher-resolution version of a reference image, a lower-resolution version is generated, and an initial matte is computed from the lower-resolution version. Regions having edges of a foreground object and, in some cases, having complex boundaries (e.g., hair details and other important details) are identified. Regions of the higher-resolution image corresponding to the identified regions from the lower-resolution matte are identified as boundary regions, which are cropped from the higher-resolution version of the reference image for processing by the feature alignment component 110 and matting component 112 to generate a matte for the reference image.

Different aspects of the technology described herein can also operate on different image formats, including processed image formats and/or raw image formats. In a camera system, at any given pixel, the camera sensor is sensing red, green, or blue light, providing raw values. To provide all three colors at each pixel, the camera system typically performs a demosaicing process, which takes the raw values and interpolates the two colors that are not present at the pixel to provide processed color values for each pixel. Some aspects of the technology described herein operate on processed values, while other aspects operate on raw values. The raw values can be employed, for instance, by: computing the entire matte using only the raw images as opposed to the processed images. In other aspects, raw burst images could be used to compute a better processed (i.e., demosaiced) image, and a matte could be generated from that image (e.g., using single image matting processes).

Turning next to FIGS. 2-6, examples of feature alignment and matte generation using burst images (e.g., by the feature alignment component 110 and matting component 112 of FIG. 1) are provided. As noted above, each process can be performed on entire images or image regions. Additionally, each process can be performed using raw images or processed images. The processes are can performed separately or aspects of the different processes can be employed in combination.

Figure 2:
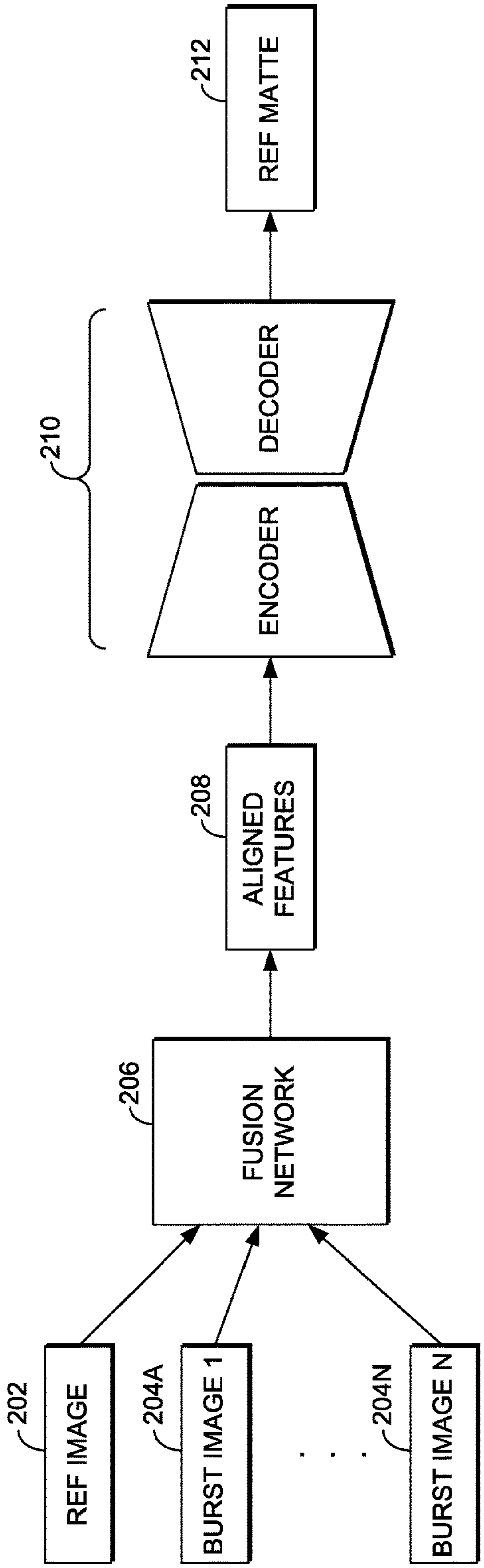
FIG. 2 is a block diagram illustrating an example of generating a matte for a reference image from an image burst using a fusion network in accordance with some implementations of the present disclosure.
Figure 3:
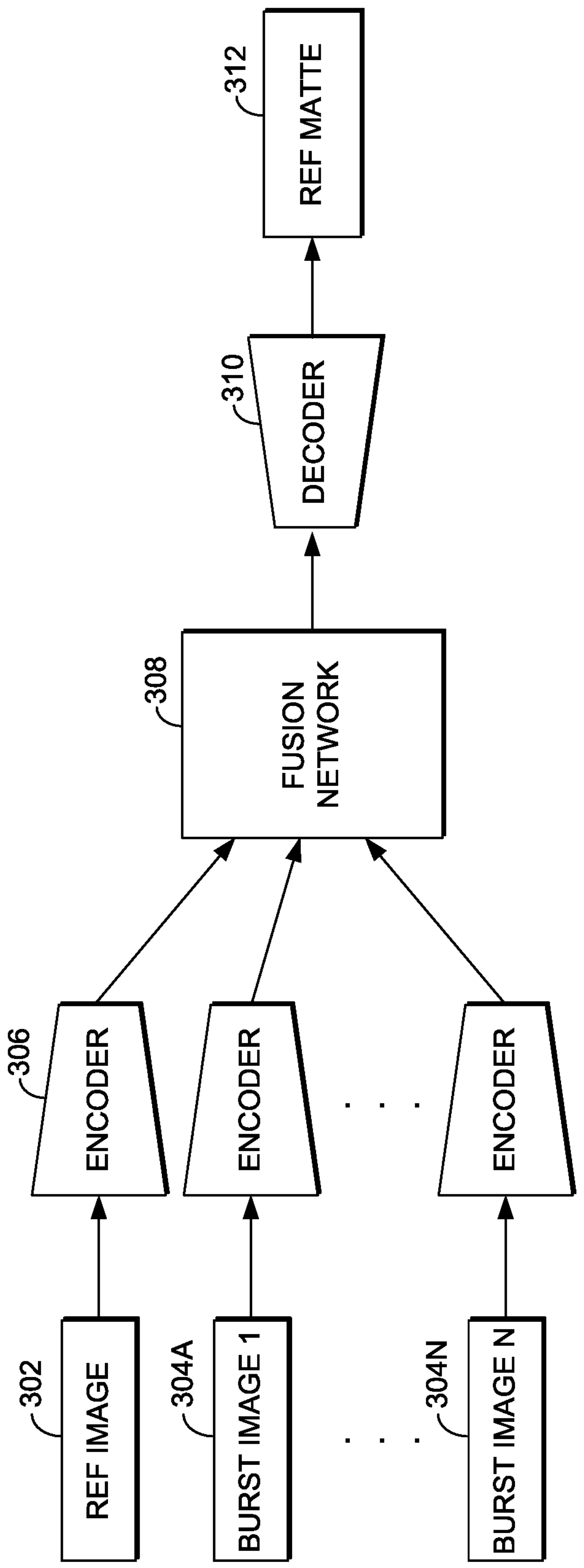
FIG. 3 is a block diagram illustrating another example of generating a matte for a reference image from an image burst using a fusion network in accordance with some implementations of the present disclosure.
Figure 4:
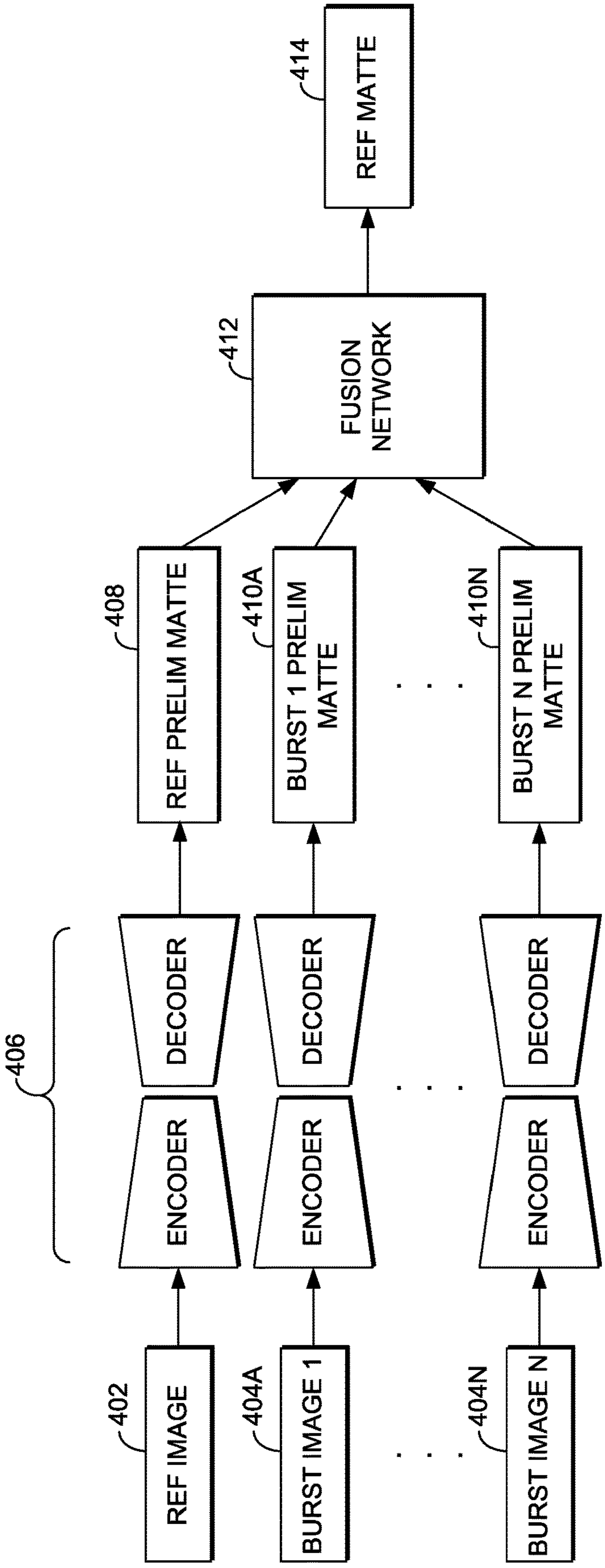
FIG. 4 is a block diagram illustrating a further example of generating a matte for a reference image from an image burst using a fusion network in accordance with some implementations of the present disclosure.

Initially, FIGS. 2-4 show examples in which a machine learning model (referred to herein as a fusion network) implicitly learns how to take advantage of burst images to perform feature alignment and matte generation. The machine learning model can comprise, for instance, a neural network trained to perform implicit feature alignment using burst images. While FIGS. 2-4 show separate components for feature alignment and matte generation, in some configurations, the components can be comprise subnetworks of a neural network (which can be trained individually or collectively in various configurations).

FIG. 2 provides a block diagram showing an example in which a fusion network performs feature alignment before matte processing. As shown in FIG. 2, a set of burst images is received that includes a reference image 202 and other burst images 204A-204N. The reference image 202 and other burst images 204A-204N are provided as input to a fusion network 206 that generates aligned features 208, which provides information regarding the alignment of features between the reference image 202 and other burst images 204A-204N. In some aspects, the aligned features 208 comprise an enhanced image that combines aligned features from the burst images. For instance, the enhanced image could be provided by enhancing the reference image 202 with additional information based on the alignment of features from the other burst images 204A-204N with features from the reference image 202. The aligned features 208 are used by a machine learning model 210 to generate a matte 212 for the reference image 202. In the example of FIG. 2, the machine learning model 210 comprises a neural network having an encoder-decoder framework. However, it should be understood that other architectures could be employed. Additionally, while the fusion network 206 and machine learning model 210 are described separately in the context of FIG. 2, they can comprise subnetworks of a neural network.

FIG. 3 provides a block diagram showing an example using a fusion network for feature alignment in the middle of an encoder-decoder framework for matte generation. As shown in FIG. 3, a set of burst images is received that includes a reference image 302 and other burst images 304A-304N. The reference image 302 and other burst images 304A-304N are each provided as input to an encoder 306 that generates a feature map for each image. The feature maps are provided as input to a fusion network 308 that generates aligned feature information from the feature maps. The aligned feature information from the fusion network 308 is provided as input to a decoder 310, which outputs a matte 312 for the reference image 302.

FIG. 4 provides a block diagram showing an example using a fusion network for feature alignment after preliminary mattes have been generated for burst images. As shown in FIG. 4, a set of burst images is received that includes a reference image 402 and other burst images 404A-404N. The reference image 402 and other burst images 404A-404N are each provided as input to a machine learning model 406 that generates a preliminary matte for each image, including reference image preliminary matte 408 and other burst image preliminary mattes 410A-410N. In the example of FIG. 4, the machine learning model 406 comprises a neural network having an encoder-decoder framework. However, it should be understood that other architectures could be employed. The reference image preliminary matte 408 and other burst image preliminary mattes 410A-410N are provided as input to a fusion network 412 that aligns features between the reference image preliminary matte 408 and other burst image preliminary mattes 410A-410N and generates a matte 414 for the reference image 402.

Figure 5:
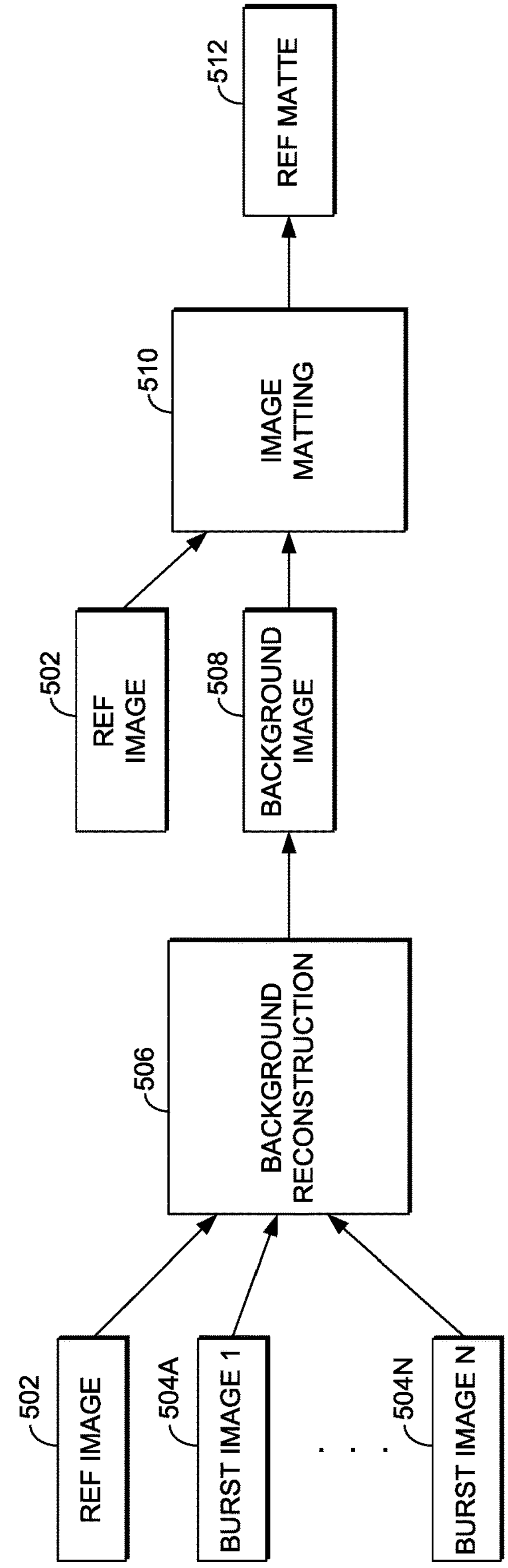
FIG. 5 is a block diagram illustrating an example of generating a matte for a reference image from an image burst using a background reconstruction from the image burst in accordance with some implementations of the present disclosure.

Turning next to FIG. 5, a block diagram is provided showing an example in which a background is reconstructed from burst images and used for matte generation. As shown in FIG. 5, a set of burst images is received that includes a reference image 502 and other burst images 504A-504N. Background reconstruction 506 is performed using the set of burst images to generate a background image 508. In some aspects, the background image 508 is reconstructed by aligning the burst images in local areas. This could include aligning regions of the burst images (e.g., boundary regions) and determining color values of background pixels in those regions based on the information provided across the burst images (i.e., the background in a local area is visible in some images while not visible in others). The background pixel values could be determined, for instance, using a neural network trained to recover background pixel values given a set of burst images. Some configurations do not generate a background for regions fully covered by the foreground in all the burst images. Since these regions are definitely foreground, there is no need to reconstruct the background in the regions. Accordingly, the background image 508 may comprise only background portions relevant to boundary regions as opposed to a background for the entire extent of area captured in the burst images. The reference image 502 (or portions thereof) and the background image 508 are provided as input to image matting 510 to generate a reference matte 512 for the reference image 502. The image matting 510 can employ any of a number of techniques for generating a matte for an image using a known background for the image.

Figure 6:
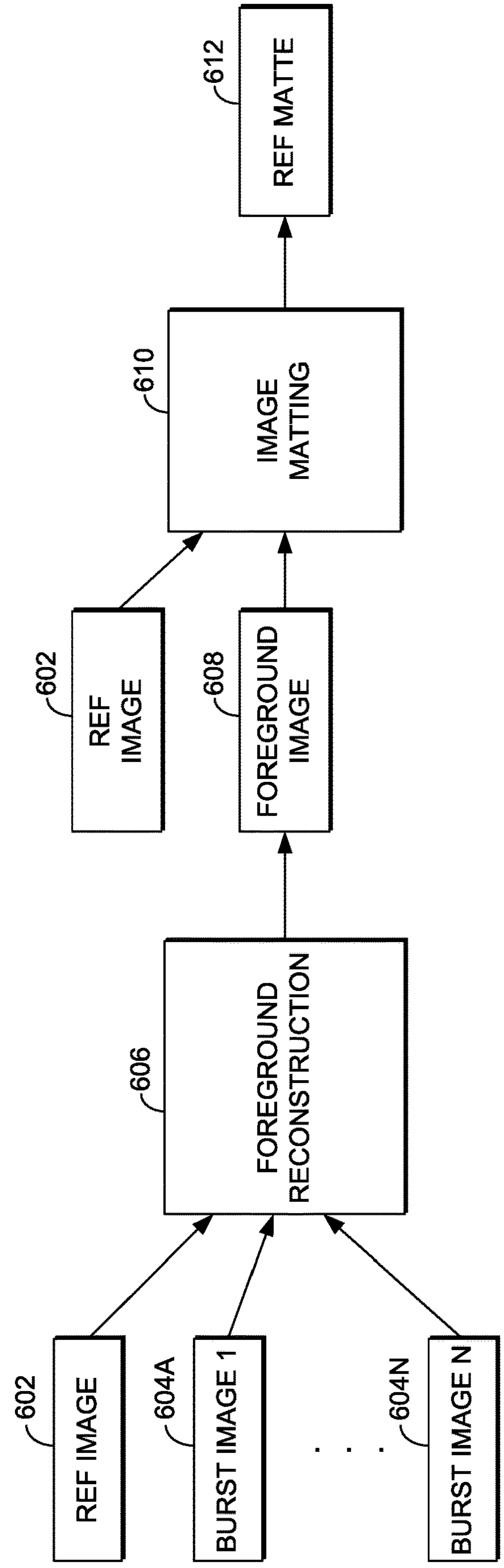
FIG. 6 is a block diagram illustrating an example of generating a matte for a reference image from an image burst using a foreground reconstruction from the image burst in accordance with some implementations of the present disclosure.

With reference now to FIG. 6, a block diagram is provided showing an example in which a foreground is reconstructed from burst images and used for matte generation. As shown in FIG. 6, a set of burst images is received that includes a reference image 602 and other burst images 604A-604N. Foreground reconstruction 606 is performed using the set of burst images to generate a foreground image 608. In some aspects, the foreground image 608 is reconstructed by aligning the burst images in local areas. This could include aligning regions of the burst images (e.g., boundary regions) and determining color values of foreground pixels in those regions based on the information provided across the burst images (i.e., aligning portions of fine detail of the foreground object in which the pixel have color values from both the foreground and background). The foreground pixel values could be determined, for instance, using a neural network trained to recover foreground pixel values given a set of burst images. The reference image 602 (or portions thereof) and the foreground image 608 are provided as input to an image matting 610 to generate a reference matte 612 for the reference image 602. The image matting 610 can employ any of a number of techniques for generating a matte for an image using a known foreground for the image.

Returning to FIG. 1, the image processing system 104 further includes a training component 114 for training one or more machine learning models (e.g., neural networks) to align features from burst images and/or generate a matte for a reference using aligned features. The training component 114 trains the machine learning models on a training dataset comprising sets of burst images. The training dataset can include real burst images (i.e., burst images captured by a camera system) and/or synthetic burst images (i.e., burst images generated from a single image). To generate synthetic burst images from a given image, in some configurations, affine transformations are applied to the foreground and the background of the image, and elastic transformations are applied to the foreground. The various images for the synthetic burst are generated by pasting transformed foregrounds on transformed backgrounds.

The machine learning models are trained using one or more loss functions. In some instances, a loss function is applied on the alpha value. The loss function could use an L1 or L2 loss, but other loss functions could be used (focal loss, cross-entropy, etc.). Some configurations employ a composition loss on the matting method, in which the computed alpha by the machine learning model is used to compose the foreground image onto the background image and the result is compared to a ground truth image.

For background reconstruction training, some aspects could employ a synthetic image burst dataset. This dataset provides the background image that the foreground was pasted onto. In some configurations, the input includes the RGB images in the image burst and the output is the reconstructed background of the reference image (or all burst images). When creating the dataset, pixels in the target background that are not occluded in at least one image in the burst are tracked. A loss is applied to those pixels, and in some instances, a loss is applied in a trimap area as well. The loss can be standard loss function such as an L1 or L2 loss.

Embodiments employing machine learning techniques for multiple aspects (e.g., background reconstruction followed by matting) can employ a single machine learning model or separate machine learning models. When using multiple machine learning models (e.g., a background reconstruction machine learning model followed by a matting machine learning model), the models can trained together end-to-end or separately.

The image processing system 104 further includes a user interface component 118 that provides one or more user interfaces for interacting with the image processing system 104. The user interface component 118 provides one or more user interfaces to a user device, such as the user device 102. In some instances, the user interfaces can be presented on the user device 102 via the application 108, which can be a web browser or a dedicated application for interacting with the image processing system 104. For instance, the user interface component 118 can provide user interfaces for, among other things, interacting with the image processing system 104 to enter image bursts and/or designate a reference image for an image burst (although a reference image can be automatically selected in some instances). The user interfaces can further provide for presenting mattes generated for image bursts by the technology described herein and/or employing generated mattes in downstream image processing operations.

Example Methods for Burst Image Matting

Figure 7:
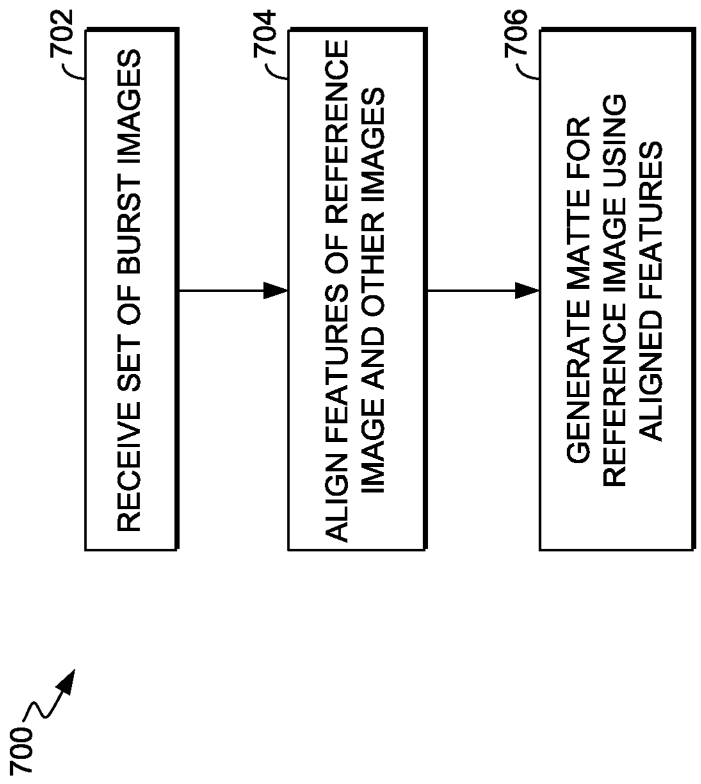
FIG. 7 is a flow diagram showing a method for generating a matte for a reference image from an image burst in accordance with some implementations of the present disclosure.

With reference now to FIG. 7, a flow diagram is provided that illustrates a method 700 for generating a matte for a reference image from an image burst. The method 700 can be performed, for instance, by the image processing system 104 of FIG. 1. Each block of the method 700 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 702, an image burst is received. The image burst includes a set of burst images, including a reference image and any number of other burst images. The burst images can comprise processed images or raw images. Features of the reference image are aligned with features from the other burst images, as shown at block 704. The feature alignment generally involves aligning portions of the reference image with corresponding portions of the other burst images. The feature alignment can use a variety of different techniques for feature alignment, including, for instance, implicitly learning aligned features using a machine learning model (e.g., a fusion network), background reconstruction, foreground reconstruction, and/or foreground modeling. A matte is generated for the reference image using the aligned features, as shown at block 706. The matte can be generated using any of a number of different matte generation techniques depending the feature alignment technique employed. In some instances, a machine learning model generates the matte for the reference image using the aligned features from the image burst.

Figure 8:
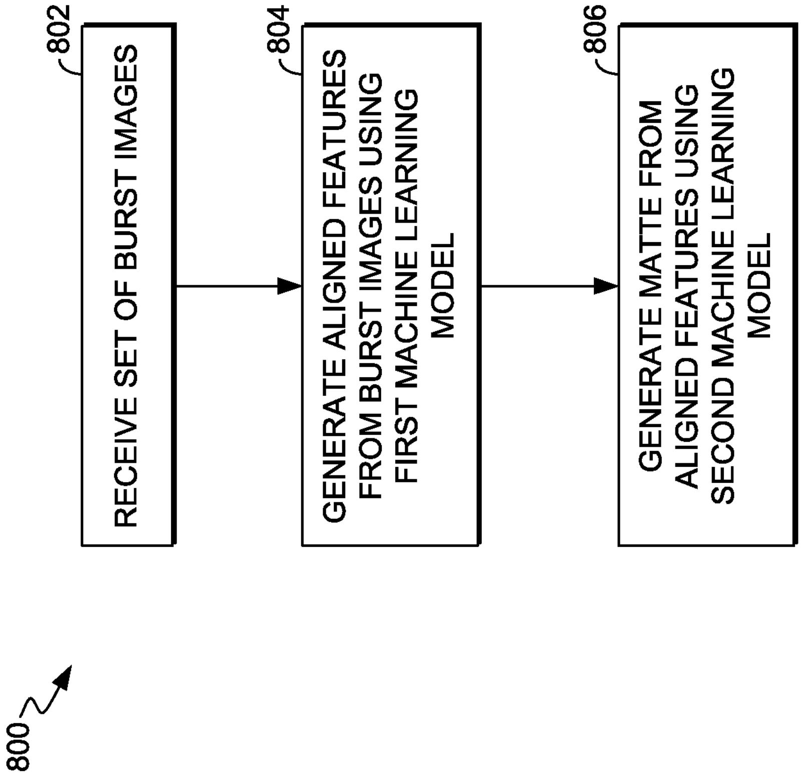
FIG. 8 is a flow diagram showing a method for generating a matte for a reference image from an image burst using a machine learning model before matte processing in accordance with some implementations of the present disclosure.

FIG. 8 is a flow diagram showing a method 800 for generating a matte for a reference image from an image burst using a machine learning model before matte processing. As shown at block 802, an image burst is received. The image burst includes a set of burst images, including a reference image and any number of other burst images. The burst images can comprise processed images or raw images. As shown at block 804, first machine learning model is caused to generated aligned features from the burst images. This could comprise, for instance, providing the reference image and other burst images as input to a fusion network, which generates aligned features by implicitly aligning features from the reference image and the other burst images. A second machine learning model is caused to generate a matte from the aligned features, as shown at block. This could comprise, for instance, providing the aligned features to a matting network (e.g., using an encoder-decoder or other network architecture) to generate a matte for the reference image.

Figure 9:
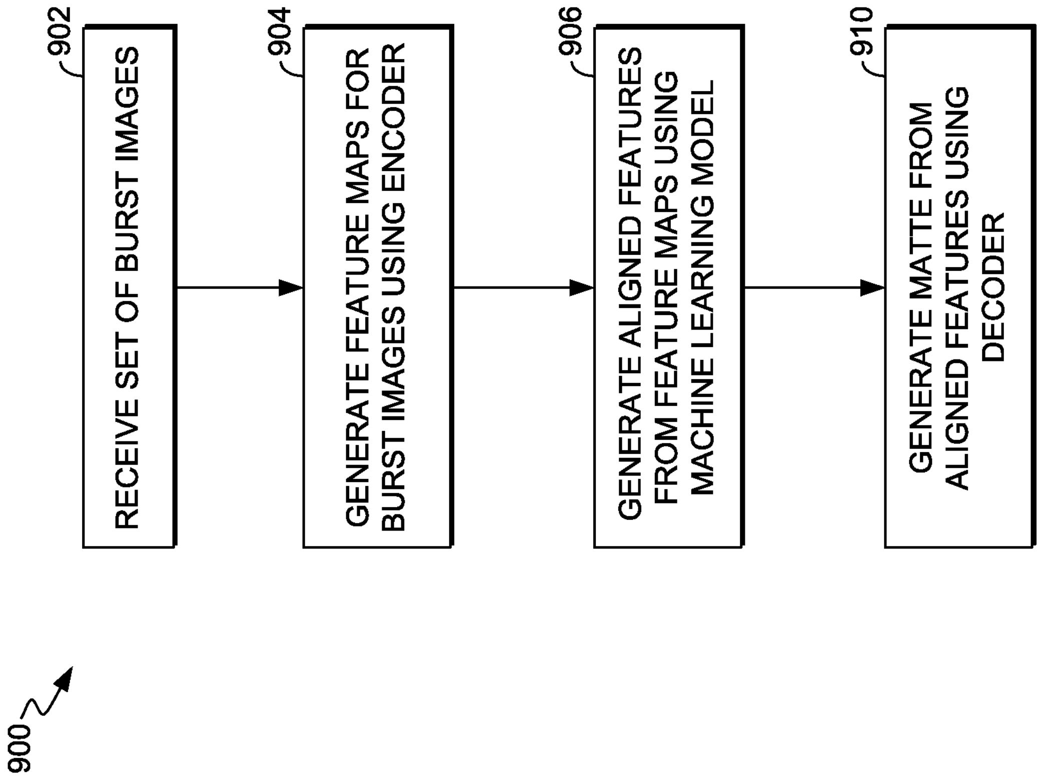
FIG. 9 is a flow diagram showing another method for generating a matte for a reference image from an image burst using a machine learning model during matte processing in accordance with some implementations of the present disclosure.

FIG. 9 is a flow diagram showing another method 900 for generating a matte for a reference image from an image burst using a machine learning model during matte processing. As shown at block 902, an image burst is received. The image burst includes a set of burst images, including a reference image and any number of other burst images. The burst images can comprise processed images or raw images. As shown at block 904, an encoder is caused to generate a feature map for the reference image and each of the other burst images. A machine learning model is caused to generate aligned features using the feature maps for the reference image and other burst images, as shown at block 906. For instance, the feature maps could be provided as input to a fusion network, which generates the aligned features based on the feature maps. As shown at block 908, a decoder is caused to generate a matte for the reference image using the aligned features.

Figure 10:
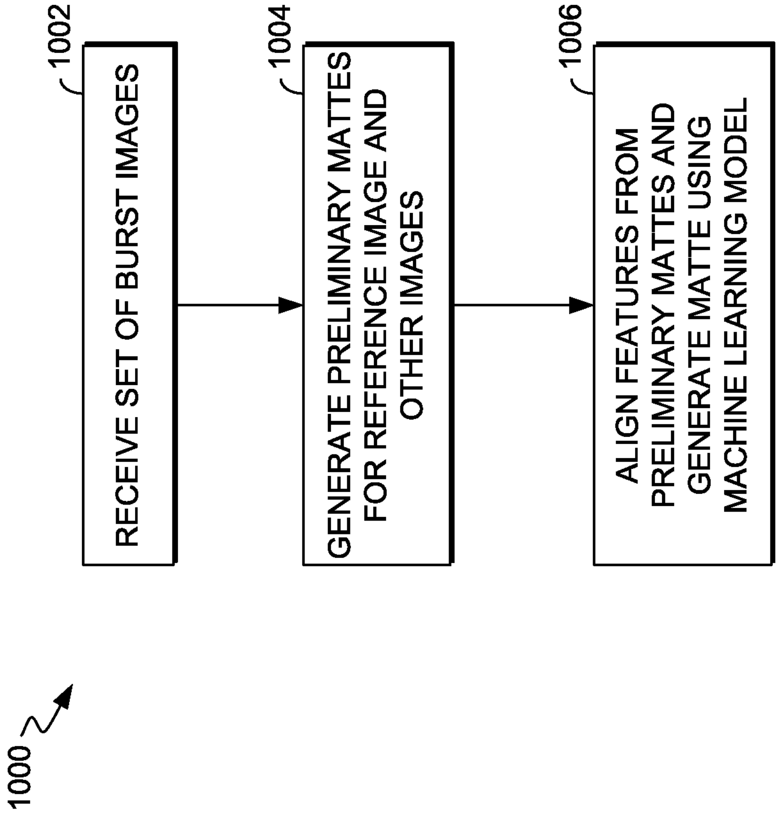
FIG. 10 is a flow diagram showing a further method for generating a matte for a reference image from an image burst using a fusion network on preliminary mattes for burst images in accordance with some implementations of the present disclosure.

FIG. 10 is a flow diagram showing a further method 1000 for generating a matte for a reference image from an image burst using a fusion network on preliminary mattes for burst images. As shown at block 1002, an image burst is received. The image burst includes a set of burst images, including a reference image and any number of other burst images. The burst images can comprise processed images or raw images. As shown at block 1004, preliminary mattes are generated for the reference image and each of the other burst images. The preliminary mattes can be generated, for instance, using any single image matte generation technique. As shown at block 1006, the preliminary mattes are provided as input to a machine learning model (e.g., a fusion network) which aligns features from the preliminary mattes and generates an image matte for the reference image.

Figure 11:
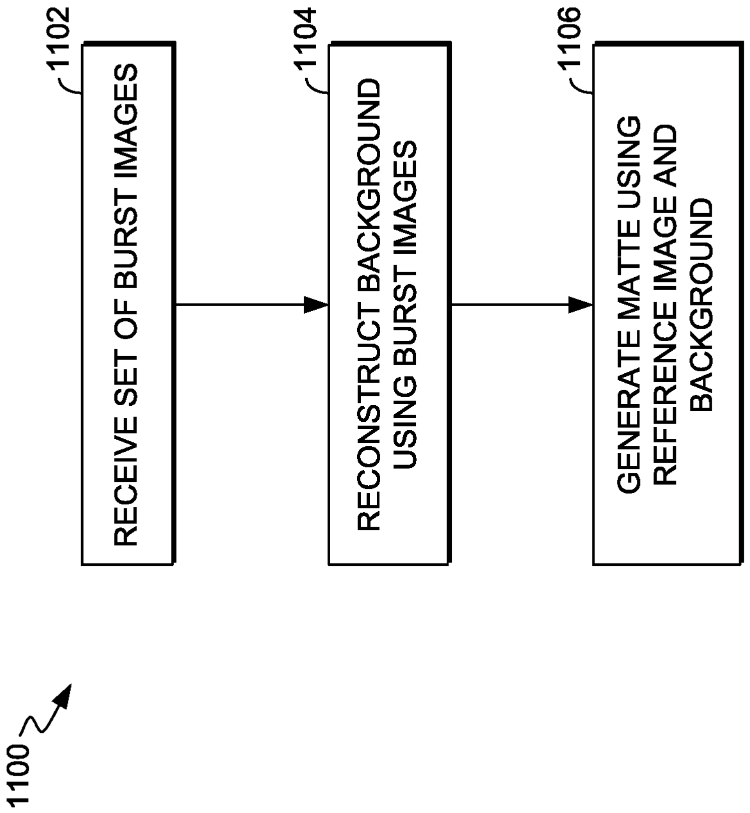
FIG. 11 is a flow diagram showing a method for generating a matte for a reference image from an image burst using a background reconstruction from the image burst in accordance with some implementations of the present disclosure.

FIG. 11 is a flow diagram showing a method 1100 for generating a matte for a reference image from an image burst using a background reconstruction from the image burst. As shown at block 1102, an image burst is received. The image burst includes a set of burst images, including a reference image and any number of other burst images. The burst images can comprise processed images or raw images. As shown at block 1104, a background image is reconstructed using the burst images. This could include, for instance, aligning features from the burst image to generate background pixel values (e.g., in boundary regions between the foreground and background). As shown at block 1106, a matte is generated using the reference image and the background. For instance, the reference image and background could be provided to a machine learning model trained to generate a matte given an image with a foreground object and a background for the image.

Figure 12:
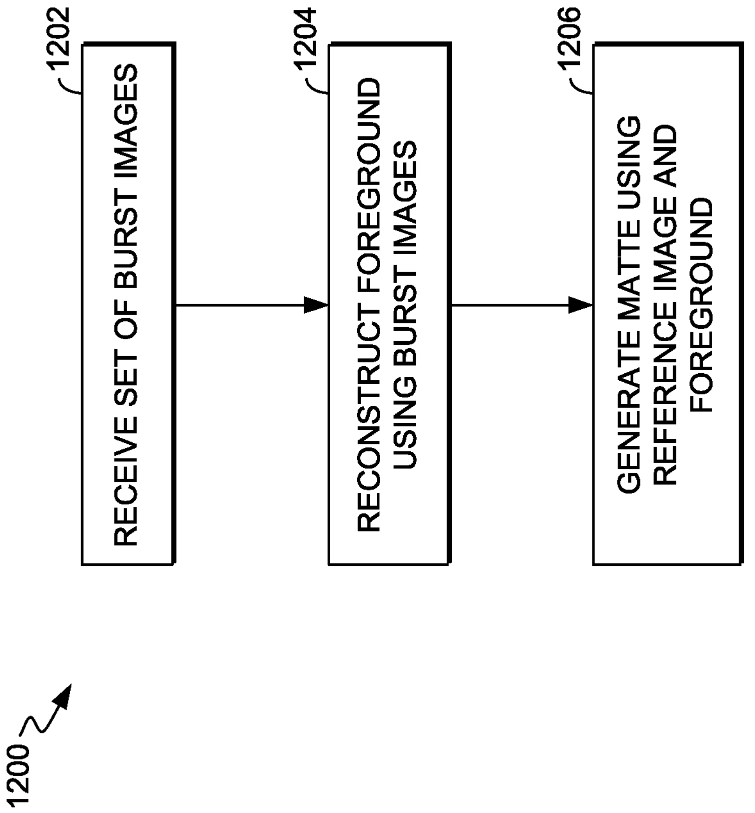
FIG. 12 is a flow diagram showing a method for generating a matte for a reference image from an image burst using a foreground reconstruction from the image burst in accordance with some implementations of the present disclosure.

FIG. 12 is a flow diagram showing a method 1200 for generating a matte for a reference image from an image burst using a foreground reconstruction from the image burst. As shown at block 1202, an image burst is received. The image burst includes a set of burst images, including a reference image and any number of other burst images. The burst images can comprise processed images or raw images. As shown at block 1204, a foreground image is reconstructed using the burst images. This could include, for instance, aligning features from the burst image to generate foreground pixel values (e.g., in boundary regions between the foreground and background). As shown at block 1206, a matte is generated using the reference image and the foreground. For instance, the reference image and foreground could be provided to a machine learning model trained to generate a matte given an image with a foreground object and a foreground for the image.

Exemplary Operating Environment

Figure 13:
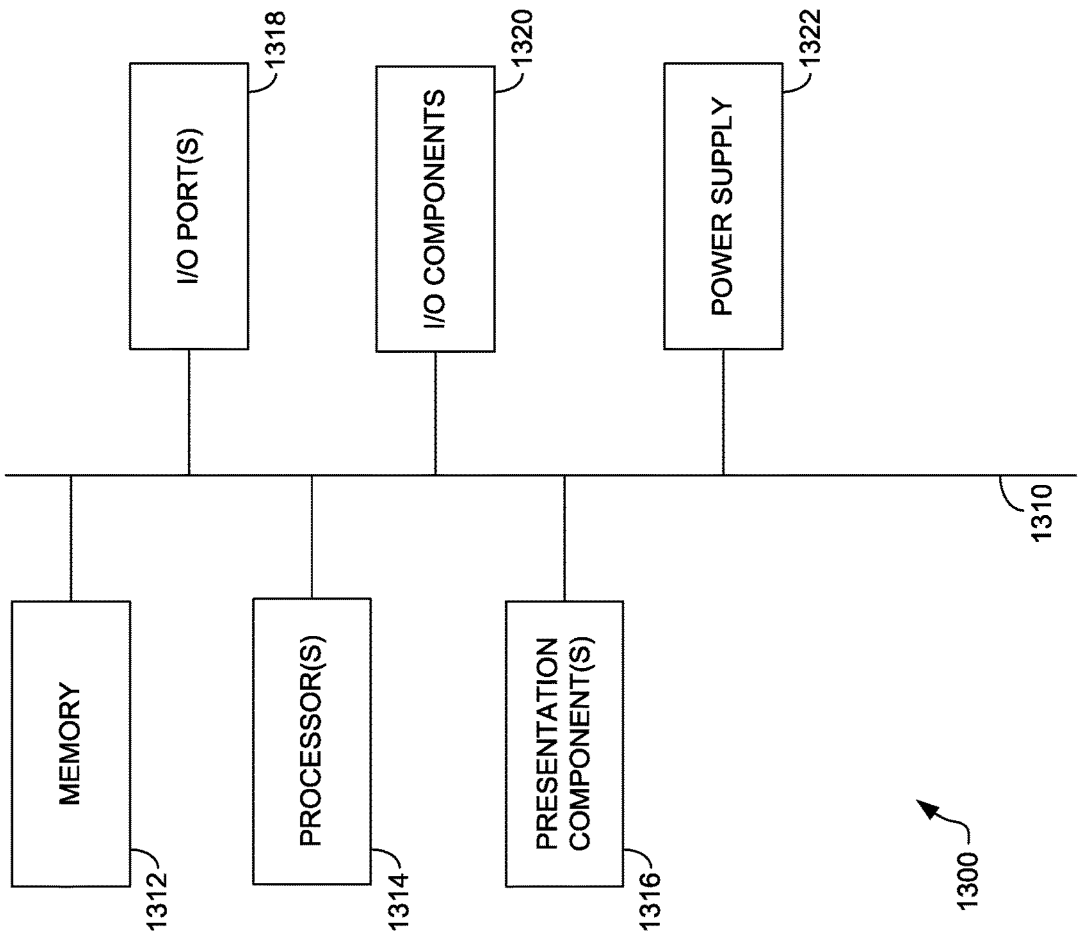
FIG. 13 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring initially to FIG. 13 in particular, an exemplary operating environment for implementing embodiments of the present technology is shown and designated generally as computing device 1300. Computing device 1300 is but one example of a suitable computing environment and is not intended to suggest any limitation as to the scope of use or functionality of the technology. Neither should the computing device 1300 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 13, computing device 1300 includes bus 1310 that directly or indirectly couples the following devices: memory 1312, one or more processors 1314, one or more presentation components 1316, input/output (I/O) ports 1318, input/output components 1320, and illustrative power supply 1322. Bus 1310 represents what can be one or more busses (such as an address bus, data bus, or combination thereof). Although the various blocks of FIG. 13 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 13 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 13 and reference to "computing device."

Computing device 1300 typically includes a variety of computer-readable media. Computer-readable media can be any available media that can be accessed by computing device 1300 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1300. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1312 includes computer storage media in the form of volatile and/or nonvolatile memory. The memory can be removable, non-removable, or a combination thereof. Exemplary hardware devices include solid-state memory, hard drives, optical-disc drives, etc. Computing device 1300 includes one or more processors that read data from various entities such as memory 1312 or I/O components 1320. Presentation component(s) 1316 present data indications to a user or other device. Exemplary presentation components include a display device, speaker, printing component, vibrating component, etc.

I/O ports 1318 allow computing device 1300 to be logically coupled to other devices including I/O components 1320, some of which can be built in. Illustrative components include a microphone, joystick, game pad, satellite dish, scanner, printer, wireless device, etc. The I/O components 1320 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 1300. The computing device 1300 can be equipped with depth cameras, such as, stereoscopic camera systems, infrared camera systems, RGB camera systems, and combinations of these for gesture detection and recognition. Additionally, the computing device 1300 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

What is claimed is:

1. One or more computer storage media storing computer-useable instructions that, when used by a computing device, cause the computing device to perform operations, the operations comprising:

receiving an image burst comprising a set of images of a scene having a foreground object of interest and a background;

selecting a reference image from the set of images for matte generation, wherein the foreground object of interest is present in the reference image;

aligning features of the reference image with features of other images from the set of images to provide aligned features, wherein the aligning comprises using information from boundary regions between the foreground object of interest and the background in the set of images, including comparing boundary regions of other images with corresponding boundary regions of the reference image, to resolve ambiguities in boundary regions between the foreground object of interest and the background in the reference image; and generating, using the aligned features between the reference image and the other images, an alpha matte for the reference image that comprises alpha values indicating high opacity for pixels of the reference image for the foreground object of interest and alpha values indicating low opacity for pixels of the reference image for the background, such that the alpha matte retains the foreground object of interest and removes the background when applied to the reference image.

2. The one or more computer storage media of claim 1, wherein aligning the features of the reference image with the features of the other images comprises causing a first machine learning model to generate the aligned features using the reference image and the other images; and wherein generating the alpha matte for the reference image comprises causing a second machine learning model to generate the alpha matte using the reference image and the aligned features.

3. The one or more computer storage media of claim 1, wherein aligning the features of the reference image with the features of the other images comprises:

causing an encoder to generate a feature map for the reference image and features maps for the other images; and causing a machine learning model to generate the aligned features using the feature map for the reference image and the features maps for the other images; and wherein generating the alpha matte for the reference image comprises causing a decoder to generate the alpha matte using the aligned features.

4. The one or more computer storage media of claim 1, wherein aligning the features of the reference image with the features of the other images comprises:

generating a preliminary matte for each image from the set of images; and aligning features of the preliminary matte for the reference image and features of the preliminary matte for the other images.

5. The one or more computer storage media of claim 1, wherein aligning the features of the reference image with the features of the other images comprises:

identifying the boundary regions in the reference image and the boundary regions in the other images, wherein the aligned features are from comparison of the boundary regions in the reference image with the boundary regions in the other images.

6. The one or more computer storage media of claim 5, wherein the boundary regions in the reference image and the boundary regions in the other images are determined using a trimap.

7. The one or more computer storage media of claim 1, wherein generating the alpha matte for the reference image using the aligned features comprises:

generating a background image using the aligned features; and generating the alpha matte using the reference image and the background image.

8. The one or more computer storage media of claim 1, wherein generating the alpha matte for the reference image using the aligned features comprises:

generating a foreground image using the aligned features; and generating the alpha matte using the reference image and the foreground image.

9. The one or more computer storage media of claim 1, wherein the set of images comprises raw images.

10. A computer-implemented method comprising:

receiving an image burst comprising a set of images of a scene having a foreground object of interest and a background;

selecting a reference image from the set of images for matte generation wherein the foreground object of interest is present in the reference image;

generating a background reconstruction from the set of images using feature alignment information generated by aligning portions of the reference image with portions of other images from the set of images, wherein the aligning comprises using information from boundary regions between the foreground object of interest and the background in the set of images, including comparing boundary regions of other images with corresponding boundary regions of the reference image, to resolve ambiguities in boundary regions between the foreground object of interest and the background in the reference image; and generating an alpha matte for a reference image from the set of images using the reference image and the background reconstruction, wherein the alpha matte comprises alpha values indicating high opacity for pixels of the reference image for the foreground object of interest and alpha values indicating low opacity for pixels of the reference image for the background, such that the alpha matte retains the foreground object of interest and removes the background when applied to the reference image.

11. The computer-implemented method of claim 10, wherein the background reconstruction is generated for the boundary regions between the foreground object of interest and the background in the reference image.

12. The computer-implemented method of claim 11, wherein the boundary regions of the reference image are based on a trimap for the reference image.

13. The computer-implemented method of claim 10, wherein the set of images comprises raw images.

14. A computer system comprising:

one or more processors; and one or more computer storage media storing computer-useable instructions that, when used by the one or more processors, causes the one or more processors to perform operations comprising:

receiving an image burst comprising a set of images of a scene having a foreground object of interest and a background, the set of images including a reference image and a plurality of burst images, wherein the foreground object of interest is present in the reference image;

determining feature alignment information by aligning portions of the reference image with portions of the burst images, wherein the aligning comprises using information from boundary regions between the foreground object of interest and the background in the set of images, including comparing boundary regions of other images with corresponding boundary regions of the reference image, to resolve ambiguities in boundary regions between the foreground object of interest and the background in the reference image; and generating, using the feature alignment information between the reference image and the burst images, an alpha matte for the reference image that comprises alpha values indicating high opacity for pixels of the reference image for the foreground object of interest and alpha values indicating low opacity for pixels of the reference image for the background, such that the alpha matte retains the foreground object of interest and removes the background when applied to the reference image.

15. The computer system of claim 14, wherein determining the feature alignment information comprises generating the feature alignment information using a first machine learning model, and wherein generating the alpha matte for the reference image comprises generating the alpha matte using a second machine learning model.

16. The computer system of claim 14, wherein determining the feature alignment information comprises:

generating feature maps for the reference image and the burst images using an encoder; and generating the feature alignment information using a first machine learning network and the feature maps.

17. The computer system of claim 14, wherein determining the feature alignment information comprises:

generating preliminary mattes for the reference image and the burst image; and aligning features of the preliminary matte for the reference image and features of the preliminary mattes for the burst images.

18. The computer system of claim 14, wherein the portions of the reference image and the portions of the burst images are determined using a trimap.

19. The computer system of claim 14, wherein generating the alpha matte for the reference image comprises:

generating a background image using the feature alignment information; and generating the alpha matte using the reference image and the background image.

20. The computer system of claim 14, wherein generating the alpha matte for the reference image comprises:

generating a foreground image using the feature alignment information; and generating the alpha matte using the reference image and the foreground image.

* * * * *